(12) United States Patent
Eskerica et al.

(10) Patent No.: US 12,233,712 B2
(45) Date of Patent: Feb. 25, 2025

(54) CRADLE FOR A COMMERCIAL ELECTRIC VEHICLE CHASSIS

(71) Applicant: Optimal Inc., Plymouth, MI (US)

(72) Inventors: Nenad Eskerica, Plymouth, MI (US); Jingyu Liu, Plymouth, MI (US); Boris Bagaric, Plymouth, MI (US); Song L. Young, Plymouth, MI (US)

(73) Assignee: Optimal Inc., Plymouth, MA (US)

( * ) Notice: Subject to any disclaimer, the term of this patent is extended or adjusted under 35 U.S.C. 154(b) by 303 days.

(21) Appl. No.: 17/901,415

(22) Filed: Sep. 1, 2022

(65) Prior Publication Data
US 2024/0075983 A1 Mar. 7, 2024

(51) Int. Cl.
| | |
|---|---|
| *B60K 26/00* | (2006.01) |
| *B62D 21/02* | (2006.01) |
| *B62D 25/16* | (2006.01) |
| *B62D 25/20* | (2006.01) |
| *B60R 11/00* | (2006.01) |

(52) U.S. Cl.
CPC .............. *B60K 26/00* (2013.01); *B62D 21/02* (2013.01); *B62D 25/16* (2013.01); *B62D 25/20* (2013.01); *B60R 2011/001* (2013.01); *B60R 2011/0094* (2013.01)

(58) Field of Classification Search
CPC ...... B62D 25/20; B62D 25/10; B62D 25/105; B62D 25/2018; B62D 33/06; B62D 39/00; B60K 1/00; B60K 26/00; B60R 2011/001; B60R 2011/0094
USPC ................... 296/24.34, 37.8, 37.13, 37.1
See application file for complete search history.

(56) References Cited

FOREIGN PATENT DOCUMENTS

| | | | | |
|---|---|---|---|---|
| AU | 2004207820 B2 | * | 9/2009 | ............... B60K 1/04 |
| FR | 2824051 A3 | * | 10/2002 | ............. B65D 85/68 |

OTHER PUBLICATIONS

AU2004207820 Text (Year: 2009).*
FR2824051 Text (Year: 2002).*

* cited by examiner

*Primary Examiner* — Dennis H Pedder
(74) *Attorney, Agent, or Firm* — The Rapacke Law Group, P.A.; Andrew Rapacke

(57) ABSTRACT

A cradle for a commercial electric vehicle chassis. The cradle for the commercial electric vehicle chassis includes a housing and a bottom access panel. The housing and the bottom access panel are flexibly coupled together at a shared longitudinal edge by a hinge. The housing is formed by a trellis of members and the trellis of members form one or more housing apertures in the structure of the housing.

20 Claims, 13 Drawing Sheets

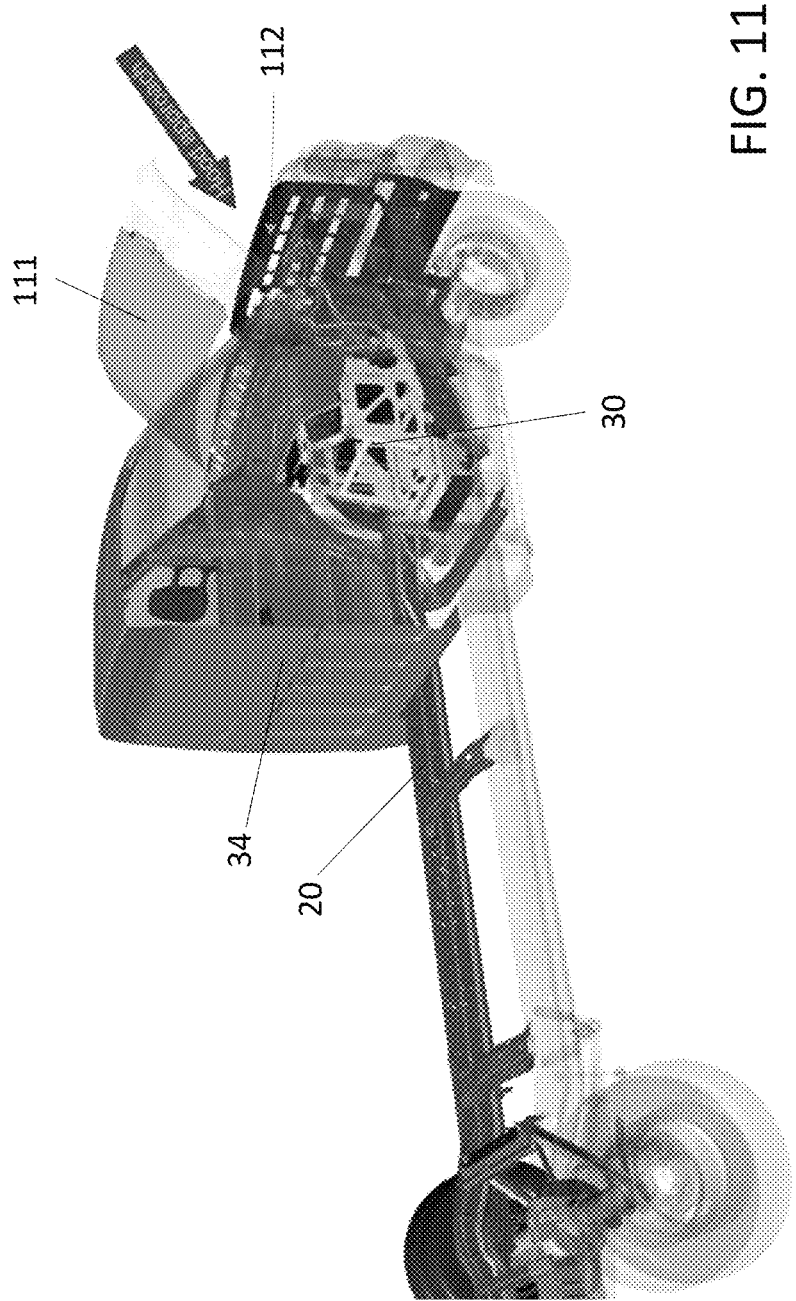

CRADLE FOR A COMMERCIAL ELECTRIC VEHICLE CHASSIS

FIELD

The present disclosure relates to a cradle mounted on the chassis of a commercial electric vehicle, and more particularly to a cradle having a housing and a bottom access panel designed to allow a service technician to enter the interior space of the cradle, at least partially, to service critical components of the commercial electric vehicle.

BACKGROUND

It is not only cars that will be powered by electricity in the future but also commercial vehicles. A commercial vehicle is any type of motor vehicle used for transporting goods, carrying specialized payloads, transporting passengers with or without compensation, and the like. Alternatively, a commercial vehicle may be considered a vehicle that is titled or registered to a company. Electric commercial vehicles are more environmentally friendly, quieter, and more efficient than commercial vehicles powered by combustion engines. Yet before commercial vehicles can be electrified across the board, several challenges must be mastered. One of these challenges, is how to service and repair the components of any commercial electric vehicle in a cost-effective, safe, and efficient manner. What is needed is a cradle for a commercial electric vehicle that locates at least the critical components of any commercial electric vehicle in a single location that can be quickly and easily accessed, in a safe and efficient manner, without specialized equipment or extensive training.

SUMMARY

A cradle for a commercial electric vehicle chassis. In various embodiments, the cradle for the commercial electric vehicle chassis includes a housing and a bottom access panel. The housing and the bottom access panel are flexibly coupled together at a shared longitudinal edge by a hinge. The housing is formed by a trellis of members and the trellis of members form one or more housing apertures in the structure or surfaces of the housing.

In various embodiments, the trellis of members includes one or more structural members and one or more flat panels. The one or more flat panels include one or more cavities forming one or more panel apertures.

In various embodiments, the bottom access panel forms an opening in the floor of the cradle when in the open position. The opening in the floor of the cradle is configured to allow a service technician to enter the interior space of the housing at least partially.

In various embodiments, the cradle is situated within a cab of the electric vehicle and secured to the chassis of the electric vehicle. In some embodiments, the electric vehicle is a commercial electric vehicle, and the cradle is secured near to the footwell of the cab of the commercial electric vehicle.

In various embodiments, the housing is configured to secure and protect at least one component of the commercial electric vehicle. The at least one component may be secured to either an interior surface of the housing or an exterior surface of the housing.

In various embodiments, the at least one component of the electric vehicle is one or more of a valve, an AC compressor, a pump, an electric power control unit, a vehicle control unit, a sensor, an on-board charging module, a power distribution unit, a positive temperature coefficient heater, a high power DC/DC converter, and the like.

In various embodiments, the one or more housing apertures and one and more panel apertures allow one or more conduits to enter an interior space of the housing, The one or more conduits being a fluid conduct or an electrical conduit.

In various embodiments, the one or more of the housing apertures is covered by one or more housing panels.

In various embodiments, at least one of the one or more housing panels is a removable housing panel configured to provide access to at least one component for service and repair even when the bottom access panel is in a closed position.

In various embodiments, at least one component of the electric vehicle is fastened to the interior surface of the bottom access panel. In some embodiments, the at least one component of the electric vehicle is a high-power DC/DC converter.

In various embodiments, the hinge supports at least a weight of the bottom access panel and the at least one component of the electric vehicle when the bottom access panel is in the open position.

In various embodiments, the bottom access panel is configured to provide access to the at least one component of the electric vehicle for service and repair when the bottom access panel is in the open position.

In various embodiments, the exterior face of the bottom access panel includes a splash guard configured to stop the projection of water and road debris into the interior of the cradle.

In various embodiments, one or more fasteners are configured to secure the bottom access panel when in the closed position. In some embodiments, the one or more fasteners may be one or more bolts.

In various embodiments, at least one of the faces of the housing is an inclined plane and at least one component of the electric vehicle is fastened to the exterior surface of the inclined plane.

In various embodiments, the size of the bottom access panel is between about 20 inches and about 60 inches. For example, the size of the access panel is about 40 inches.

In various embodiments, the shape of the bottom access panel is substantially rectangular.

In various embodiments, the trellis of members allows multiple points of access from the cab of a commercial electric vehicle to the interior of the cradle and one or more components of the commercial electric vehicle, and the bottom access panel allows at least one point of access from a service pit to the interior of the cradle and one or more components of the commercial electric vehicle.

In various embodiments, the housing of the cradle is covered by the center console of the commercial electric vehicle and is configured to be removable. Removing the center console provides access to the housing of the cradle, where at least one component of the commercial electric vehicle can be accessed by a service technician. In some embodiments, the at least one component is a critical component of the commercial electric vehicle.

Additional features and advantages of the embodiments disclosed herein will be set forth in the detailed description that follows, and in part will be clear to those skilled in the art from that description or recognized by practicing the embodiments described herein, including the detailed description which follows, the claims, as well as the appended drawings.

Both the foregoing general description and the following detailed description present embodiments intended to provide an overview or framework for understanding the nature and character of the embodiments disclosed herein. The accompanying drawings are included to provide further understanding and are incorporated into and constitute a part of this specification. The drawings illustrate various embodiments of the disclosure, and together with the description explain the principles and operations thereof.

BRIEF DESCRIPTION OF THE DRAWINGS

The features and advantages of the present disclosure will be more fully described in, or rendered obvious by, the following detailed description of the preferred embodiments, which are to be considered together with the accompanying drawings, wherein like numbers refer to like parts and further, wherein:

FIG. 11 is a perspective view of the cradle with access from the vehicle front hood, in accordance with some embodiments described herein.

DETAILED DESCRIPTION

Figure 1:
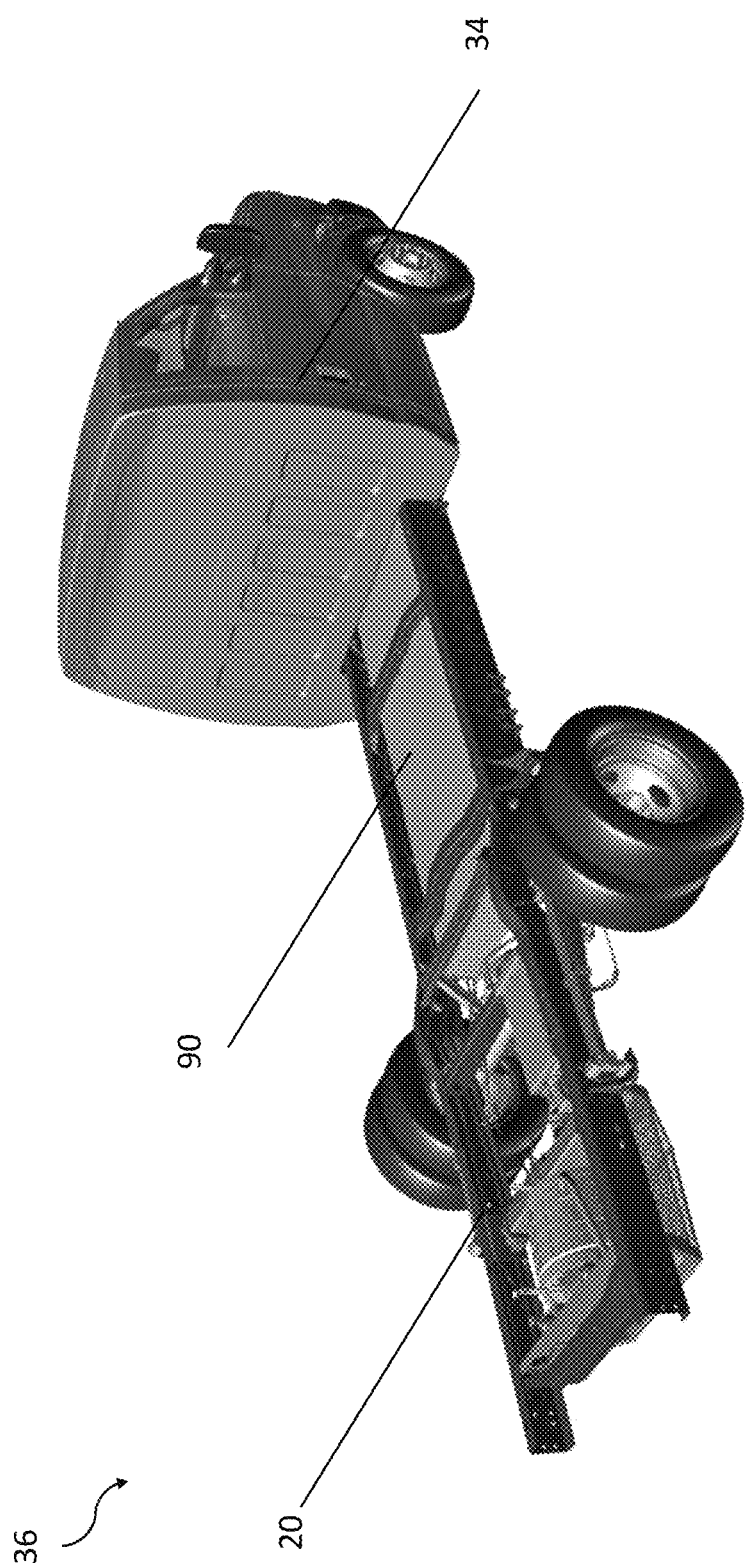
FIG. 1 is a perspective view of a commercial electric vehicle including a chassis and a cab, in accordance with some embodiments described herein.

Reference will now be made in detail to the present preferred embodiment(s), examples of which is/are illustrated in the accompanying drawings. Whenever possible, the same reference numerals will be used throughout the drawings to refer to the same or like parts.

In various embodiments, as shown in FIGS. 1-10, a cradle comprising a housing and a bottom access panel for a service technician to access one or more components, including key components, of a commercial electric vehicle is provided.

FIG. 1 shows a perspective view of an integrated chassis and cab of a commercial electric vehicle 36, comprising a vehicle chassis or frame 20 and a cab 34. The vehicle chassis 20, is the main supporting structure of the commercial electric vehicle 36 to which all the other components are attached. In some embodiments, the vehicle chassis 20 is separate from the vehicle body. This type of construction method is often referred to as body-on-frame. While many passenger vehicles no longer use this type of construction method, instead using the unibody construction method, nearly all commercial electric vehicles 36, including nearly all trucks, buses, and most pickup trucks, continue to use a separate frame for their vehicle chassis 20. Some of the most common types of frames include the ladder-type frame, the offset frame, the offset with cross member frame, the x-type frame, and the perimeter frame. Medium and heavy duty commercial electric vehicle 36, such as trucks, buses, and the like, generally use the ladder-type frame chassis structure. The main purpose of the ladder-type chassis 20 structure of a commercial electric vehicle 36 is to support the commercial electric vehicle's 36 body and mechanical components, and to support the cargo load without undue distortion, deflection, or failure in operation, statically and dynamically. The cab 34 of the commercial electric vehicle 36 is the location where at least the driver of the commercial electric vehicle 36 is seated.

The ladder-type chassis structure 20 is also the platform that the rest of the commercial electric vehicle 36 is laid on and secured to, including the axles, cab 34, one or more electric motor(s), drive system, traction battery pack (e.g. see FIGS. 1-3 in area within chassis structure 20 and below and behind passenger cab), and the like. The one or more electric motor(s), which in some applications, are hub or axial electric motor(s), convert electrical energy to mechanical energy that is delivered to wheels via a single or multi ratio transmission. The traction battery pack is made up of multiple Lithium-ion cells and stores the energy needed to run the commercial electric vehicle 36.

Figure 2:
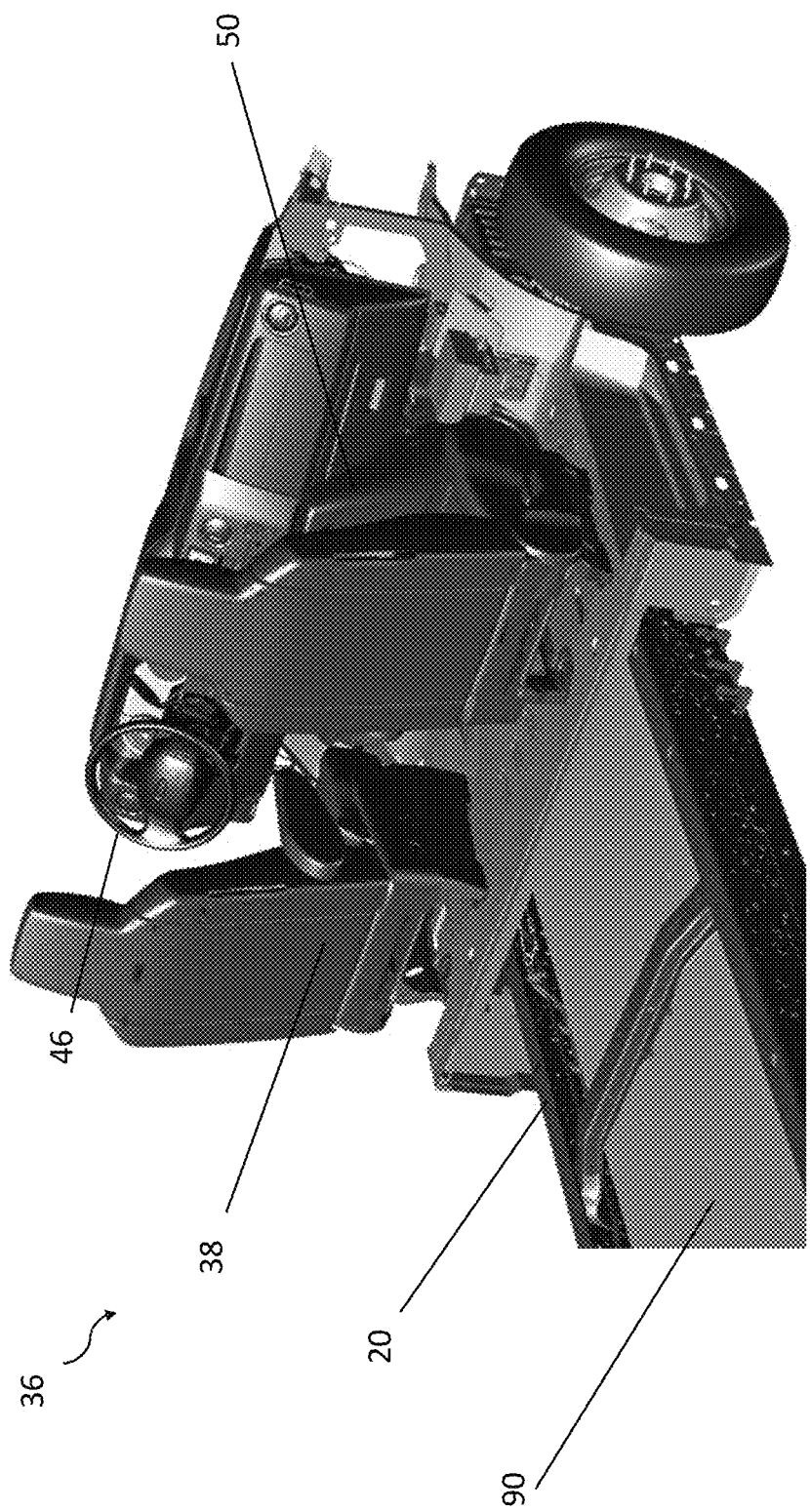
FIG. 2 is a perspective view of the commercial electric vehicle of FIG. 1 with the cab removed for the purposes of clarity, in accordance with some embodiments described herein.

FIG. 2 shows a more detailed perspective view of the front of the commercial electric vehicle 36 of FIG. 1 with the cab 34 removed for the sake of clarity. Also show in FIG. 2 is the relative positions a central console 50, steering wheel 46, and seats 38 with respect to the vehicle chassis 20.

In various embodiments, the central console 50 is in, or near, the footwell of the commercial electric vehicle 36. In some embodiments, the central console 50 is centered about the longitudinal axis of the commercial electric vehicle 36. In other embodiments, the center of the central console 50 is partially offset from the longitudinal axis of the commercial electric vehicle 36. In some applications, the central console 50 is made from recycled materials or can be recycled. In some embodiments, at least a portion of the central console 50 comprises one or more of a control-bearing surface(s), storage compartment(s), footrest(s), and the like.

Figure 3:
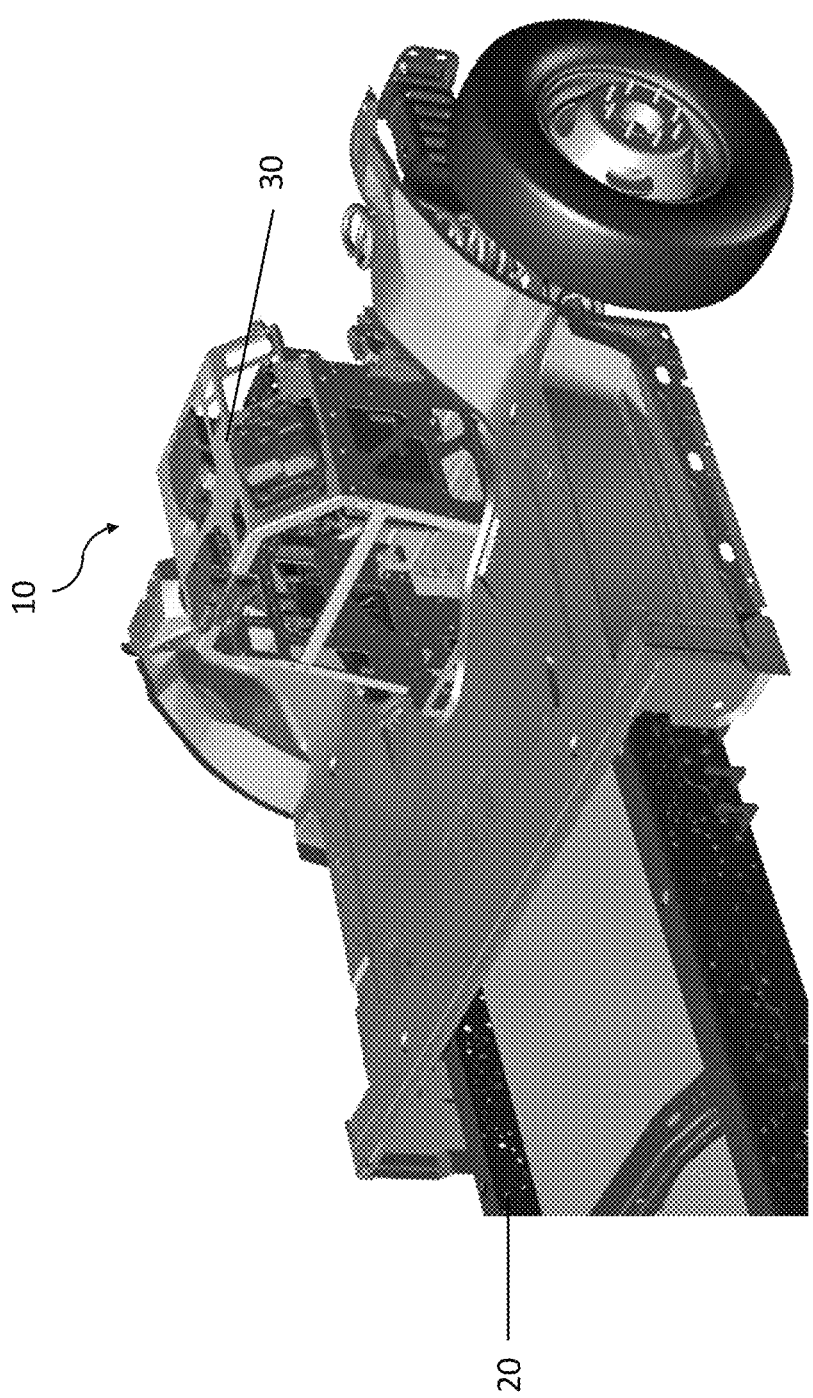
FIG. 3 is a perspective view of a cradle after the cab, front seats, center console, and instrument panel of the commercial electric vehicle of FIG. 2 have been removed for the purposes of clarity, in accordance with some embodiments described herein.

FIG. 3 shows a perspective view of a housing 30 of a cradle 10 after the central console 50, steering wheel 46, and seats 38 of the commercial electric vehicle 36 of FIG. 2 have been removed for the sake of clarity. In various embodiments, the cradle 10 is situated within the cab 34 of a commercial electric vehicle 36 and secured to the chassis 20 of the commercial electric vehicle 36. In some embodiments, the cradle 10 is secured near to the footwell of the cab 34 of the commercial electric vehicle 36.

In various embodiments, the housing 30 of the cradle 10 is covered by at least a portion of the center console 50 of the commercial electric vehicle 36, which is configured to be removed by a service technician 80 or the like. Removing the center console 50 provides access to the housing 30 of the cradle 10, where at least one component of the commercial electric vehicle 36 can be accessed by a service technician 80. In some embodiments, the at least one component is a critical component of the commercial electric vehicle 36.

Figure 4:
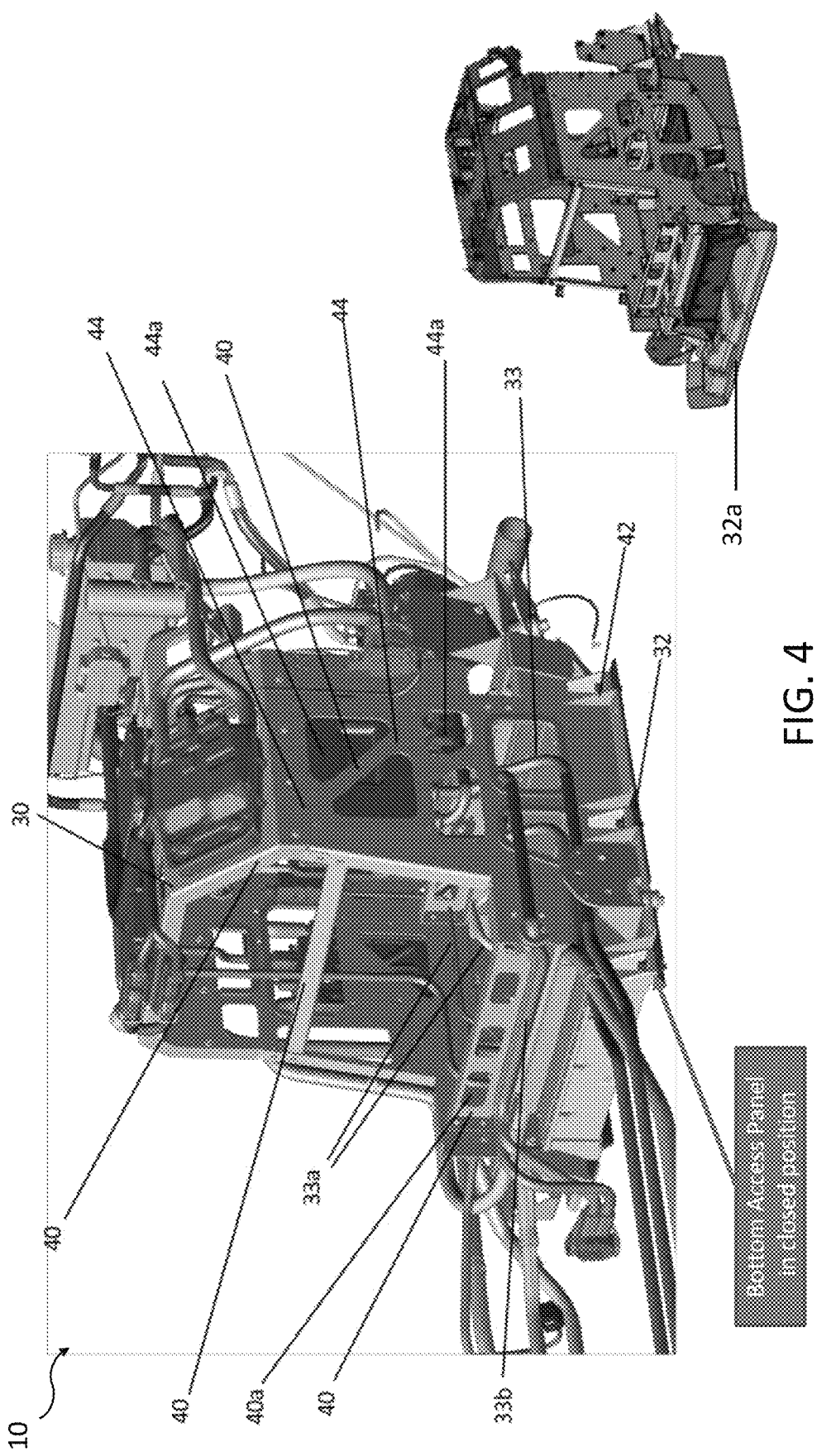
FIG. 4 is a more detailed perspective view of the cradle of FIG. 3 with a bottom access panel in the closed position, in accordance with some embodiments described herein.

FIG. 4 shows a more detailed perspective view of the cradle 10 of FIG. 3 with an openable bottom access panel 32 in the closed position. In various embodiments, the cradle 10 comprises the housing 30 and the bottom access panel 32. The housing 30 and the bottom access panel 32 are flexibly coupled together at a shared longitudinal edge by a quick-release hinge with locking mechanisms, such as fasteners or latches, to secure the two together on both the hinge side and the non-hinge side when the bottom access panel 32 is in the closed position. The housing 30 is formed by a trellis of members 40, and the trellis of members 40 forms one or more housing apertures 40a in the surfaces of the housing 30. In various embodiments, the one or more of the housing apertures 40a are covered by one or more housing panels 44. In some embodiments, at least one of the one or more of the housing panels 44 is a removable housing panel 44 configured to provide access to at least one component for service and repair even when the bottom access panel 32 is in the closed position. The cradle 10 is mechanically coupled to a front portion of the chassis 20 of the commercial electric vehicle 36. In various embodiments, the housing 30 has a shape that is substantially rectangular, comprising exterior faces that are substantially vertical and horizontally inclined. In some embodiments a DC-DC converter or other components can be part of the bottom access panel (e.g. see FIGS. 5A and 5B). In various embodiments a quick-release hinge allows quick removal of the access panel. In some embodiments, quick-release hinges 16 (e.g. see FIG. 5C) can include holes, cutouts, passthroughs, indents, or other locations of a housing 30 or coupled element, wherein a complementary sized hook, catch, extension, or other element that is coupled with or part of a bottom access panel 32 can be passed through and maintain a fixed position when in use. In some embodiments, three of these passthroughs can be located on a non-hinge side while two may be located on a hinge side.

In various embodiments, the cradle 10 is a lightweight, multi-member 40, angular-shaped frame over which one or more housing panels 44 may be fitted. In some embodiments, an additional member 40 is added to the structure to form one or more angular-shaped reinforcements in the structure. The angular-shaped structure is the most rigid frame structure.

In various embodiments, the cradle 10 comprises a space frame structure. That is, a three-dimensional skeletal frame of members 40. In some applications, the members 40 of the space frame are tubular. In some embodiments, the housing panels 44 of the space frame structure serve a structural function, in others they do not. To maximize the rigidity and minimize the weight of the cradle 10 the members 40 of the space frame structure may maximize the use of triangles and angular-shaped structure. This configuration minimizes the thickness of the skeletal frame members 40 that are needed. In some embodiments, at least some of the members 40 comprise one or more cavities forming one or more member apertures 40a to reduce weight or provide access to the interior of the housing 30.

In various embodiments, the trellis of members 40 comprises one or more structural members 40. For example, structural beams, rails, ribs, bulkheads, box sections, and the like. In some embodiments, these structural members 40 are made of channel sections that are formed by folding, rolling, or pressing carbon steel plate and the like. In some embodiments, these structural members 40 have an open-ended cross-section that is c-shaped and/or a closed-ended cross-section that is box-shaped. In some embodiments, the rigidity of the cradle 10 is increased through the use of one or more structural stiffeners.

In various embodiments, at least one component of the commercial electric vehicle 36 is fastened to at least one of the exterior surfaces and the interior surfaces of the housing 30. The housing 30 must support the weight of the at least one component, when the commercial electric vehicle 36 is going over uneven surfaces, potholes, and during sudden stops, acceleration, impacts that are the result of collisions, and the like. Further, the housing 30 must not unduly bend, twist, or flex when the commercial electric vehicle 36 is going over uneven surfaces, and the like.

In various embodiments, the trellis of members 40 comprises one or more substantially flat housing panels 44. In some embodiments, the one or more substantially flat housing panels 44 comprise one or more cavities forming one or more panel apertures 44a.

In various embodiments, the rigidity of the cradle 10 structure is increased through the use of one or more gusset plates 42. A gusset plate 42 is a thin, usually metal plate, which is typically made of steel or the like, which is used to affix independent members 40 of a structure to each other or to a beam to aid alignment. Gusset plates 42 are used in joints, bends, or otherwise disjointed structural locations that require additional support to withstand stresses. A gusset plate 42 can be fastened to a permanent member 40 by adhesive, bolts, rivets, welding, fasteners, and the like.

In various embodiments, the cradle 10 is made from a carbon steel material. In some embodiments, to achieve a lighter weight construction the cradle 10 is made of an aluminum alloy. In some embodiments, the material of the cradle 10 comprises a composite material, including plastic, carbon fiber, and the like. These composite materials provide a lightweight and sustainable solution that reduces fuel consumption and $CO_2$ emissions. In various embodiments, at least a portion of the commercial electric vehicle 36 chassis 20 comprises carbon fiber-reinforced composites. The material that the cradle 10 is made of comprises recycled materials and/or materials that can be recycled.

In various embodiments, at least one of the faces of the housing 30 is an inclined plane. In some embodiments, at least one component is fastened to at least one of the exterior faces of the inclined plane and the interior face of the inclined plane. The one or more components are fastened to the faces of the housing 30 using one or more fasteners. For example, the one or more fasteners may be one or more bolts, locking lugs, screws, and the like. In some embodiments, the one or more fasteners may be one or more tamper proof fasteners.

In various embodiments, the housing 30 comprises one or more housing apertures 40a. In some embodiments, the housing 30 comprises one or more panel apertures 44a. At least one or more of the one or more housing apertures 40a, and the one or more panel apertures 44a, are configured to allow one or more conduits 33 to enter an interior space of the housing 30. The one or more conduits 33 being a fluid conduct 33a and/or an electrical conduit 33b.

In various embodiments, the trellis of members 40 provide multiple points of access from the cab 34 of a commercial electric vehicle 36 to the interior of the housing 30. In some embodiments, the trellis of members 40 is a framework of light metal bars that is primary used to provide support for the one or more components of the commercial electrical vehicle 36. In some embodiments, the trellis of members 40 may also be configured to structurally support at least a portion of the central console 50.

At least one component of the commercial electric vehicle 36 is fastened to at least one of the interior surfaces of the housing 30 and the exterior surfaces of the housing 30. The housing 30 is configured to support the weight of the at least one component and the bottom access panel 32.

In various embodiments, the at least one component of the commercial electric vehicle 36 is one or more of a valve, an AC compressor, a coolant pump 70, a DC fast charge module 72, a vehicle control unit (VCU) 52, a sensor, an on-board charging module, a power distribution unit (PDU) 58, a positive temperature coefficient heating element 62, a high power DC/DC converter 64, a DC/AC converter, a Powertrain Electronic Control Unit, a thermal management system, and the like.

In some embodiments, the commercial electric vehicle 36 comprises one or more sensors. For example, a temperature sensor, a voltage sensor, a current sensor, ultrasound, an image sensor, a light detecting sensor, a ranging sensor, an accelerometer sensor, a speed sensor, a wheel sensor, a brake position sensor, an accelerator position sensor, and the like.

In some embodiments, an on-board-charging module converts AC received through a charge port to DC and controls the recharge current flowing into the traction battery pack.

The power distribution unit (PDU) 58 is a device comprising multiple electrical power outputs designed to distribute electric power to the various electrical systems in the commercial electric vehicle 36.

While traction battery pack delivers a substantially fixed DC output voltage the requirements of various accessory systems in the commercial electric vehicle 36, for example, the vehicles lights, infotainment system, wiper motors, window motors, and the like, require DC voltages of different levels. In various embodiments, the DC-DC converter 64 converts the fixed DC output voltage of the traction battery pack to the different voltage levels required by the various electrical systems or Electrical Control Units (ECU) in the commercial electric vehicle 36. The different voltage levels are delivered to the various ECUs by the power distribution unit 58 of the commercial electric vehicle 36 by means of one or more wiring harness or electrical conduits 33b.

The positive coefficient heater or Positive Temperature Coefficient (PTC) heating element 62 is an electrical resistance heater whose resistance increases significantly with temperature. A PTC 62 heating element has a large positive temperature coefficient of resistance. As such, PTC heating elements 62 produce a large amount of heat when the PTC heating element 62 is cold and a small amount of heat when the PTC heating element 62 is hot. As such, these types of heaters have a tendency to maintain a constant temperature and heat up quickly. In some embodiments, the PTC heating element 62 is self-regulating.

In some embodiments, the commercial electric vehicle 36 comprises an AC compressor. Instead of being driven by a belt powered by a combustion engine the AC compressor is driven one or more electric motors.

In some embodiments, an EV control module, or vehicle control unit (VCU) is a low-voltage control module that is responsible for most of the processes related to the operational aspects of the commercial electric vehicle 36. For example, the EV control unit may receive inputs from sensors related to the accelerator and brake petal positions, from which the EV control unit calculates a torque value to be sent to the power inverter. The EV control module may also be responsible for one or more of the battery charging, energy management, thermal management, torque management, and the like.

A traction battery pack(s) provides a direct current (DC) output. In some embodiments, the DC output supplied by the traction battery pack is converted to AC and supplied to the one or more electric motor(s) by a DC-AC Converter. This power transfer is managed by a sophisticated motor control systems called the Powertrain Electric Control Unit. The Powertrain Electronic Control Unit controls the frequency and the magnitude of the voltage being supplied to the one or more electric motor(s) in order to control the acceleration and speed of the commercial electric vehicle 36 responsive to the driver's commands as communicated by the accelerator and brakes of the commercial electric vehicle 36.

A Thermal Management System can be responsible for maintaining the operating temperature of the traction battery pack 90 and other powertrain components within specified limits.

In some embodiments, the one or more components attached to the housing 30 form an integral part of the cradle's 10 rigidity, thereby allowing the cradle 10 to be structurally weaker and/or lighter than the cradle 10 would otherwise be.

Figure 5A:
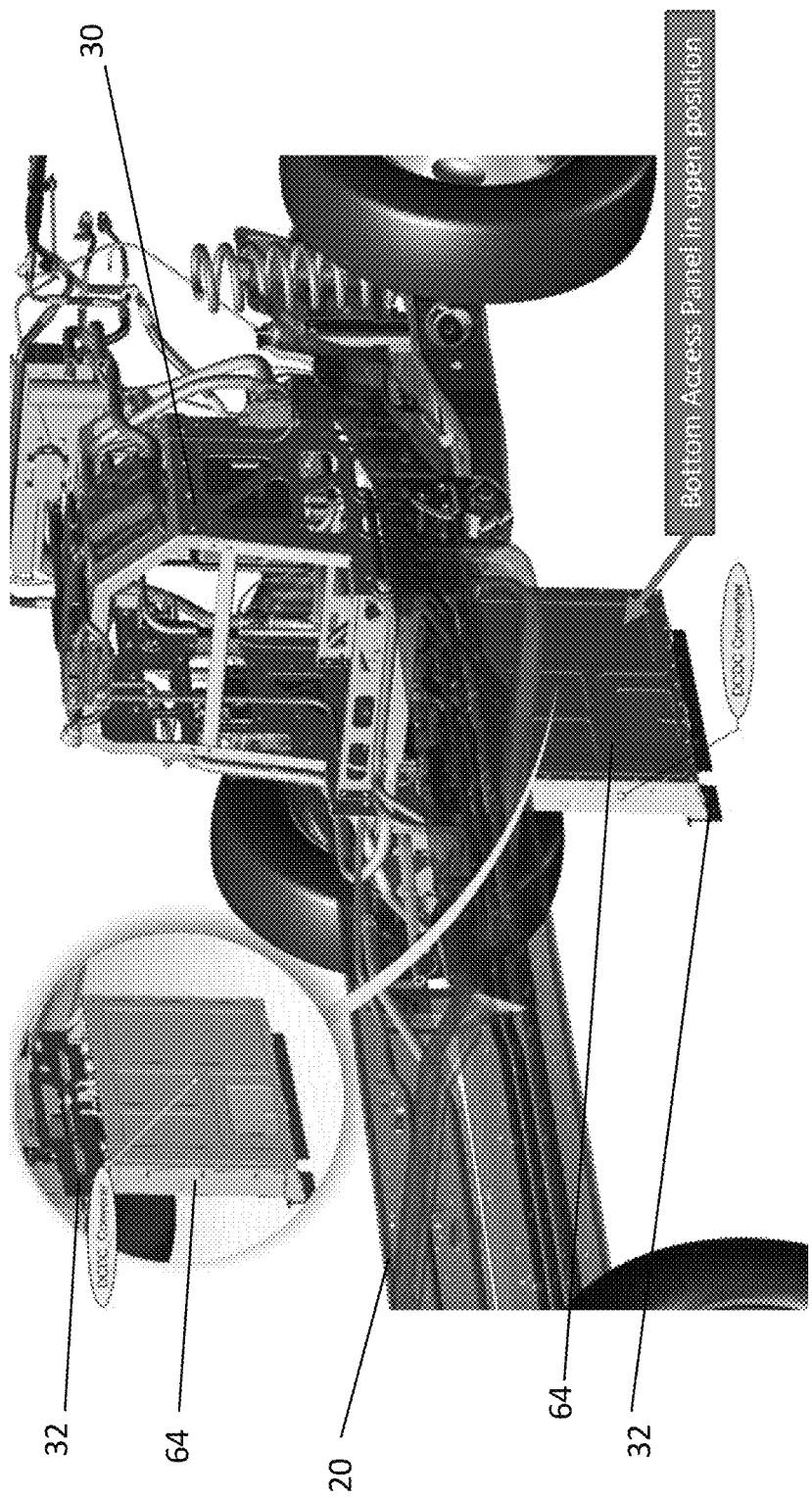
FIG. 5A is a more detailed perspective view of the cradle of FIG. 3 with the bottom access panel in the open position, in accordance with some embodiments described herein.
Figure 5B:
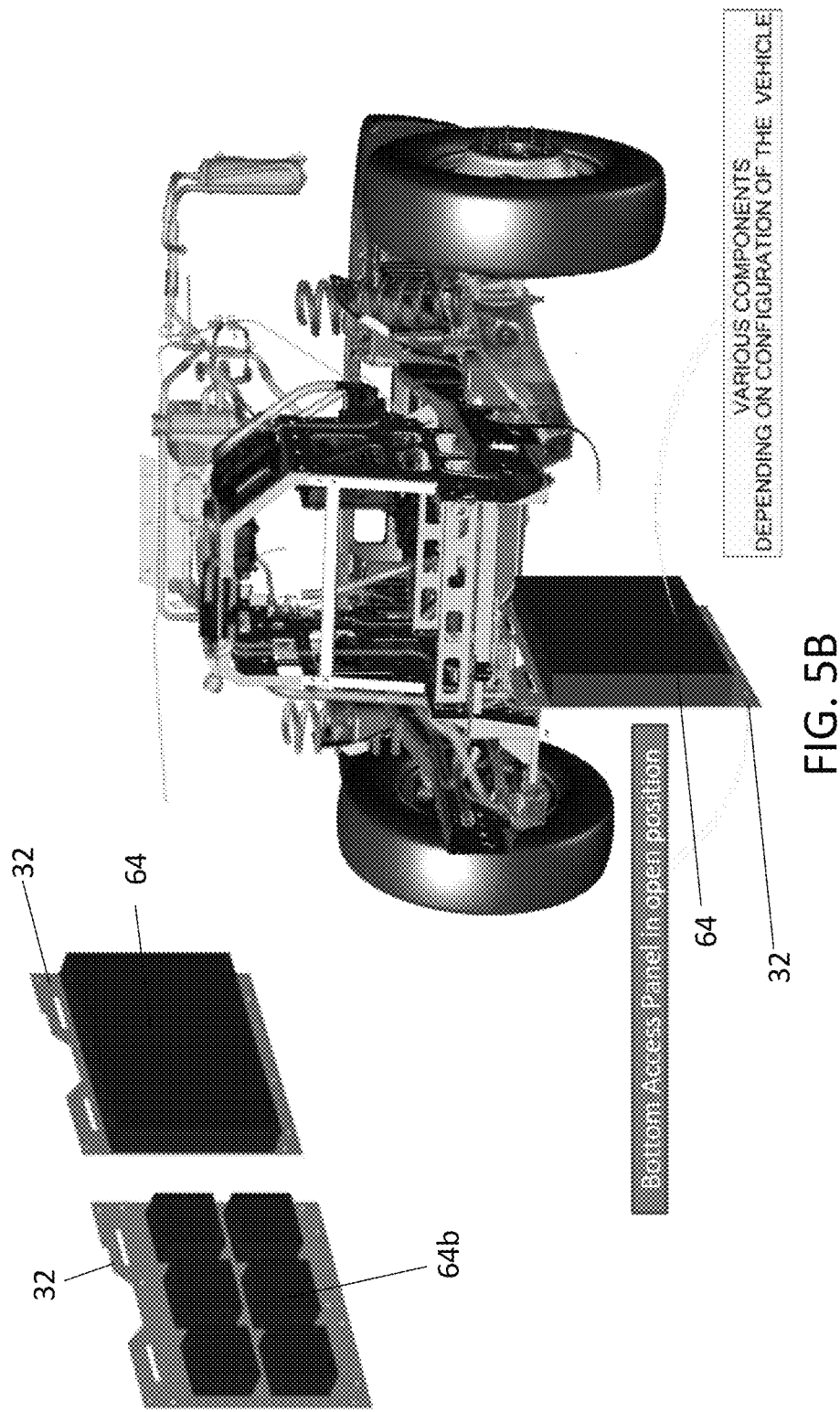
FIG. 5B shows another view of FIG. 5A, with different components coupled to or comprising bottom access panel.
Figure 5C:
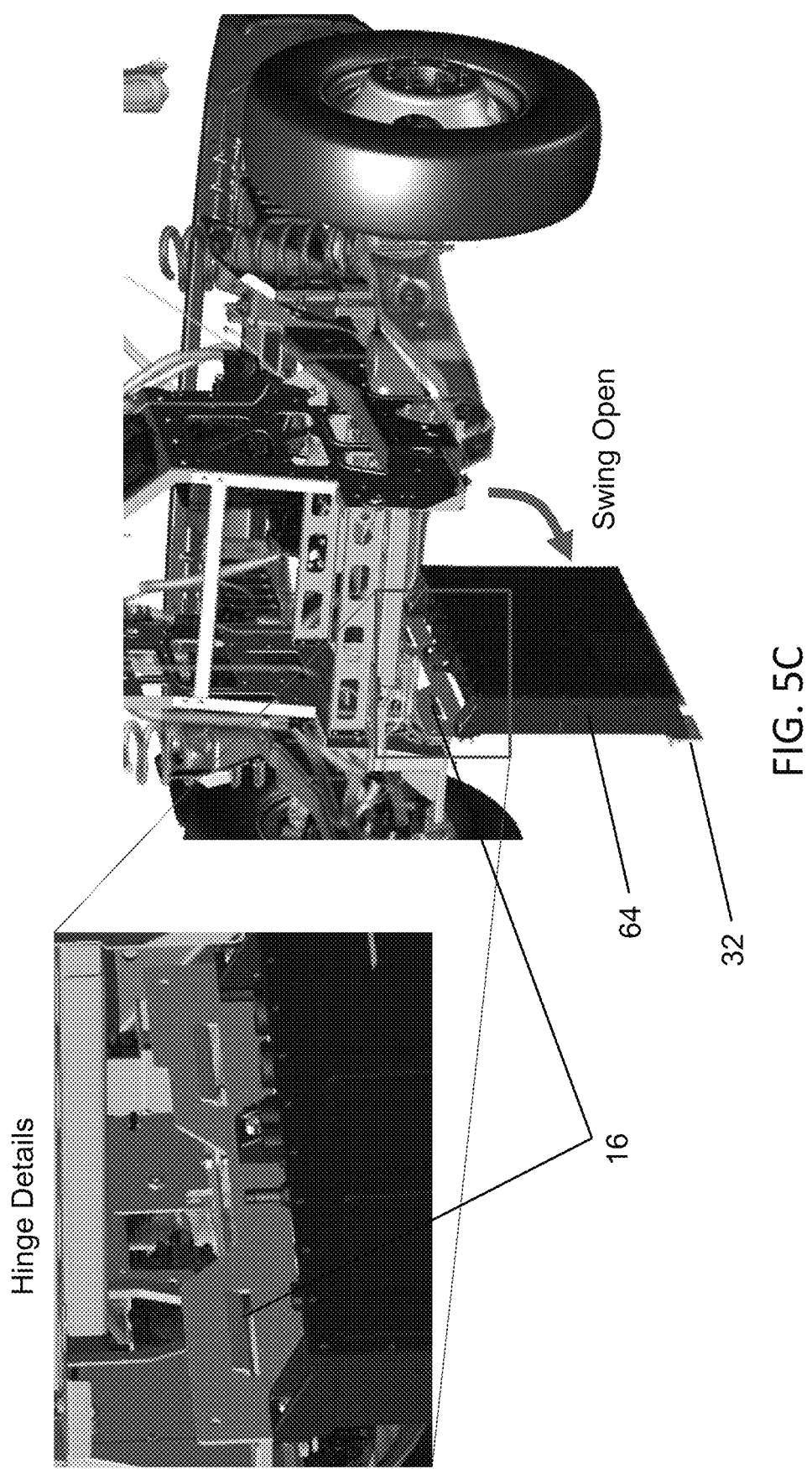
FIG. 5C shows another view of FIGS. 5A and 5B, with hinge details.

FIG. 5A is a more detailed perspective view of the cradle 10 of FIG. 3 with the bottom access panel 32 in the open position. In various embodiments, the bottom access panel 32 forms an opening in the floor of the housing 30 when in the open position. FIG. 5B shows another view of FIG. 5A, with different components 64A coupled to or comprising bottom access panel 32. FIG. 5C shows another view of FIGS. 5A and 5B, with hinge details.

In various embodiments, the hinge 16 supports at least the weight of the bottom access panel 32 and the least one component fastened to the interior face of the bottom access panel 32 when the bottom access panel 32 is in the open position. For example, a high-power DC/DC converter 64 may be fastened to the interior face of the bottom access panel 32.

In various embodiments, one or more fasteners or latches are configured to secure the bottom access panel 32 when in the closed position to the housing 30 of the cradle 10. In some embodiments, the one or more fasteners may be one or more bolts, clasp, locking lugs, screws, and the like. In some embodiments, the one or more fasteners may be one or more tamper proof fasteners.

In various embodiments, the housing 30 of the cradle 10 and the bottom access panel 32 are locked together in the closed position by a locking mechanism, which can be one or more fasteners, latches, clasps, and the like. In various embodiments, the locking mechanism can only be opened by means of a specialized tool, such as a star key, double-end hex key, TORX® key, or the like. The specialized tool restricts access and prevents the bottom access panel 32 from being tampered with. In various embodiments, the locking mechanism further comprises a seal to provide visible evidence that the bottom access panel 32 has been opened.

Figure 6:
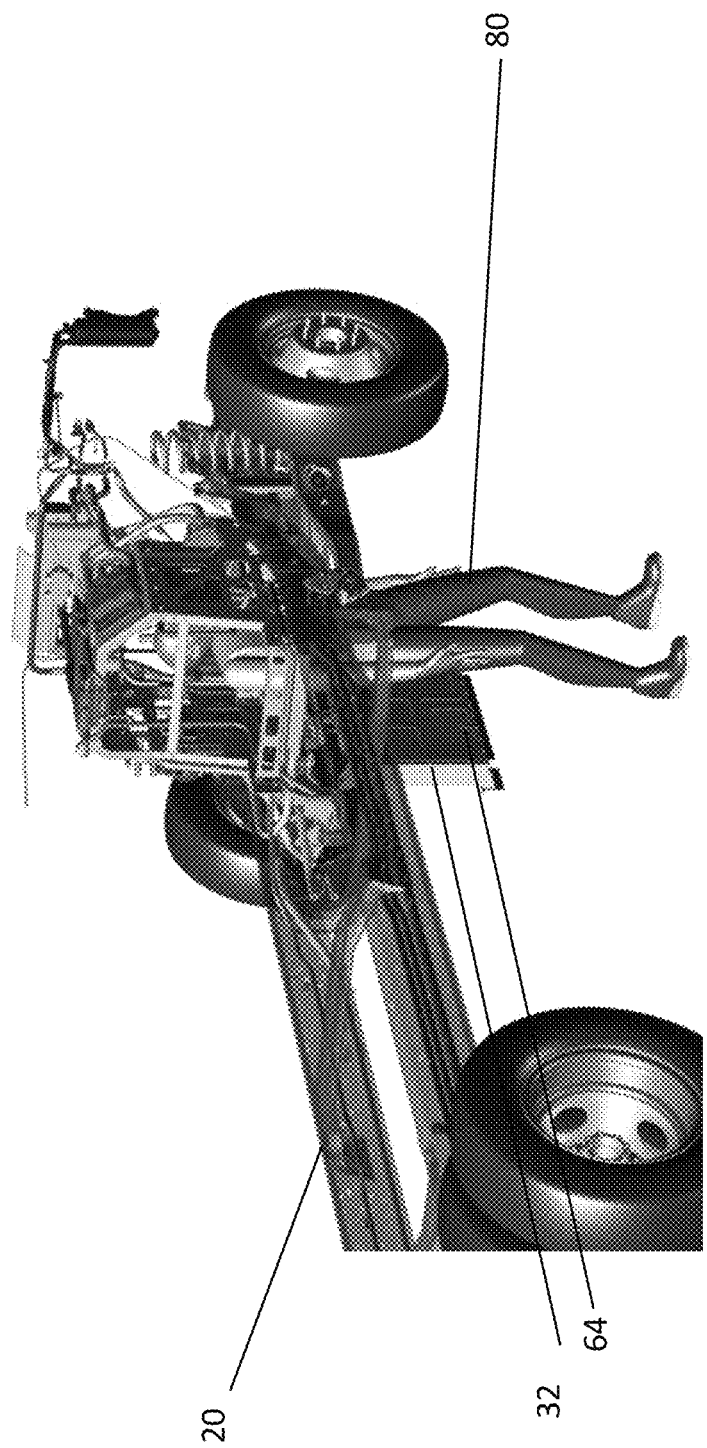
FIG. 6 is a perspective view of a service technician located partially within the interior of the housing of the cradle of FIG. 5A, in accordance with some embodiments described herein.

FIG. 6 shows a perspective view of a service technician 80 located partially within the interior of the housing 30 of the cradle 10 of FIG. 5A. The opening in the floor of the housing 30 by swinging open the bottom access panel is configured to allow the service technician 80 to enter the interior space of the housing 30 at least partially, from a service pit or service lift (not shown) or the like, and access to at least one component of the commercial electric vehicle 36 for service and repair.

Service pits or service lifts are designed to allow easy working access to the underside of commercial electric vehicles 36 for inspection, maintenance, and repair. A service pit may also be known as a vehicle inspection pit, grease pit, and the like, and is a pit or trench over which a commercial electric vehicle 36 can be driven over and parked to be serviced from below.

In various embodiments, the bottom access panel 32 has a shape that is substantially rectangular. The size of the bottom access panel 32 is between about 20 inches and about 60 inches. For example, the size of the bottom access panel 32 is about 40 inches.

Figure 7:
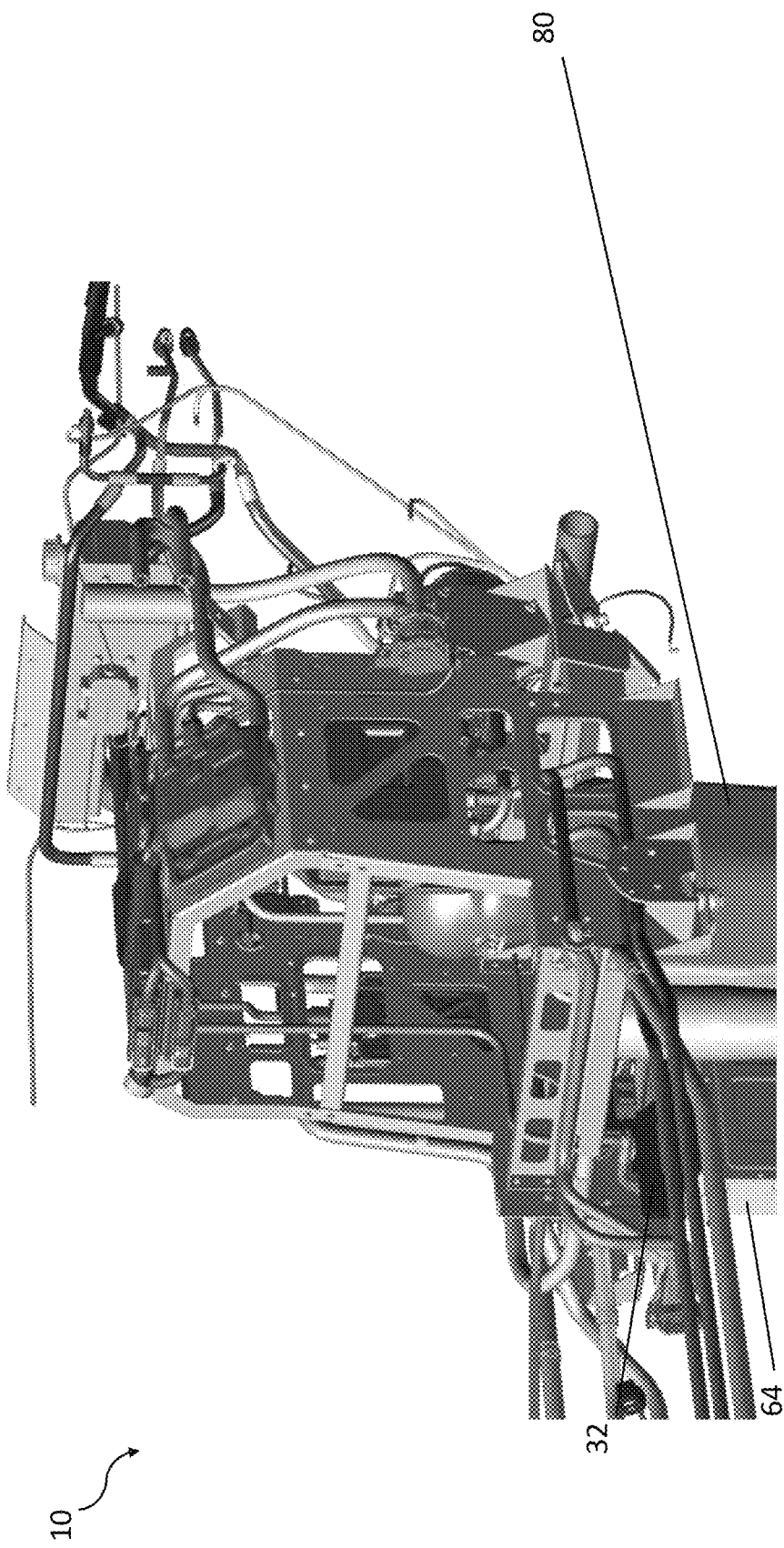
FIG. 7 is a more detailed perspective view of the service technician partial located within the interior of the housing of the cradle of FIG. 5A, in accordance with some embodiments described herein

FIG. 7 shows a more detailed perspective view of the service technician 80 located partial located within the interior 30 of the housing 30 of the cradle 10 of FIG. 4.

Figure 8:
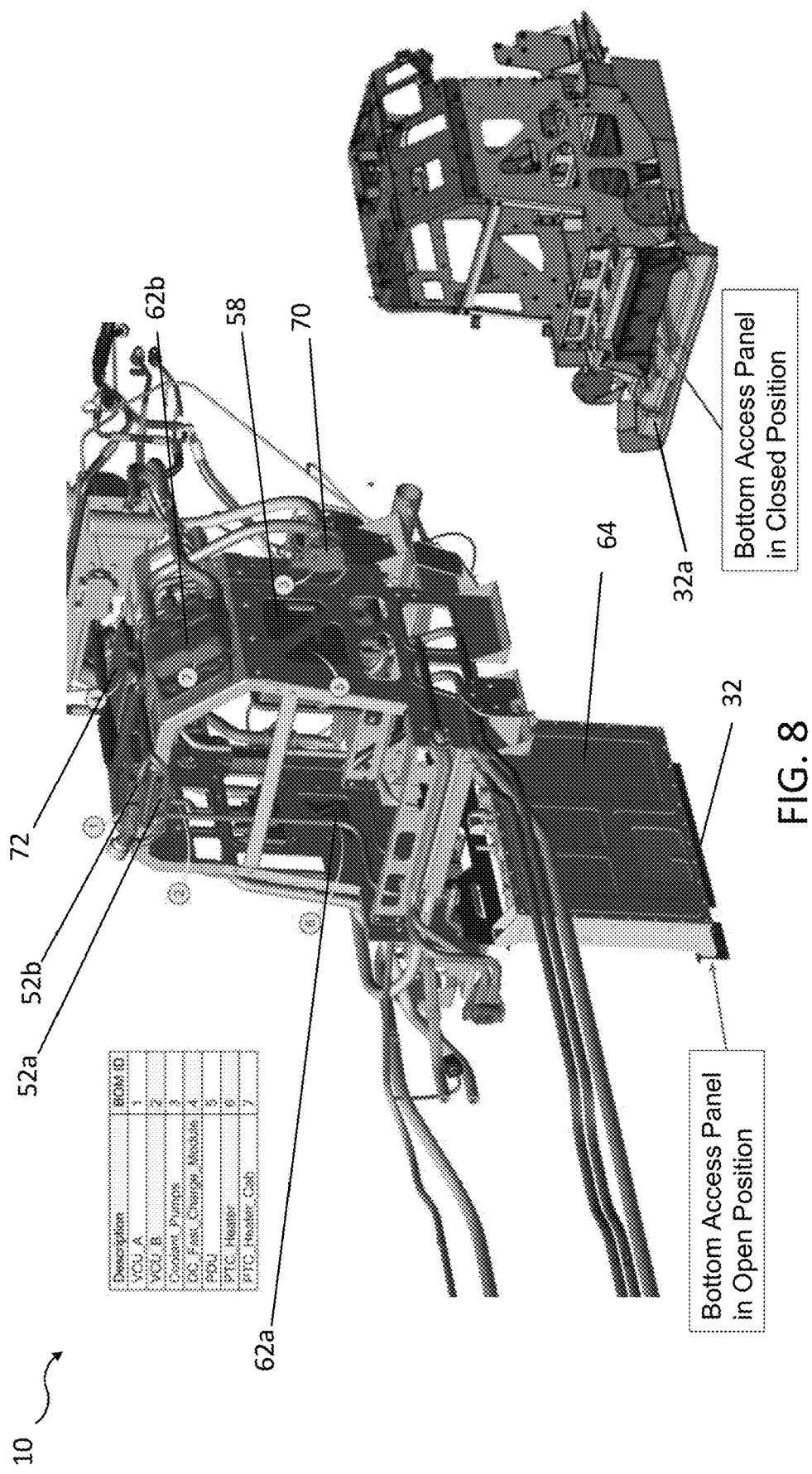
FIG. 8 shows a more detailed perspective view of the bottom access panel in the open position, in accordance with some embodiments described herein.

FIG. 8 shows a more detailed perspective view of the bottom access panel 32. In some embodiments, the exterior face of the bottom access panel 32 comprises a splash guard 32*a* or skid plate configured to stop the projection of water, mud, snow, corrosive materials, like salt, and road debris into the interior of the cradle 10. In some embodiments, the bottom access panel 32 and the splash guard 32*a* are a single component, in other embodiments, the splash guard 32*a* is fastener to the underside of the bottom access panel 32. For example, the splash is a piece of fiberglass, plastic, or metal, for example aluminum or steel, which is mounted to the underside of the bottom access panel 32. In some embodiments, one or more of the bottom access panel 32 and the splash guard 32*a* are configured to reduce acoustic noise in the cab 34 of the commercial electric vehicle 36.

In various embodiments, at least one of the bottom access panel 32 and the splash guard 32*a* is operable to provide complete protection against the ingress of dust, oil, other airborne particles, and non-corrosive material.

In various embodiments, at least one of the bottom access panel 32 and the splash guard 32*a* is operable to provide complete protection against water projected from a nozzle from any direction. In some embodiments, even water projected in powerful jets from any direction has no harmful effects on the one or more components located within the housing 30. That is, at least one of the bottom access panel 32 and the splash guard 32*a*, alone or in combination, has an Ingress Protection (IP) of at least one of IP65 and IP66.

In various embodiments, the splash guard 32*a* is configured not to affect the aerodynamics of the commercial electric vehicle 36. In some embodiments, the splash guard 32*a* is made by injection molding. Splash guards 32*a* made by injection molding are highly durable, inexpensive, light, rigid, and streamlined. One or more of the bottom access panel 32 and the splash guard 32*a* are configured to act as a thermal insulator.

Figure 9:
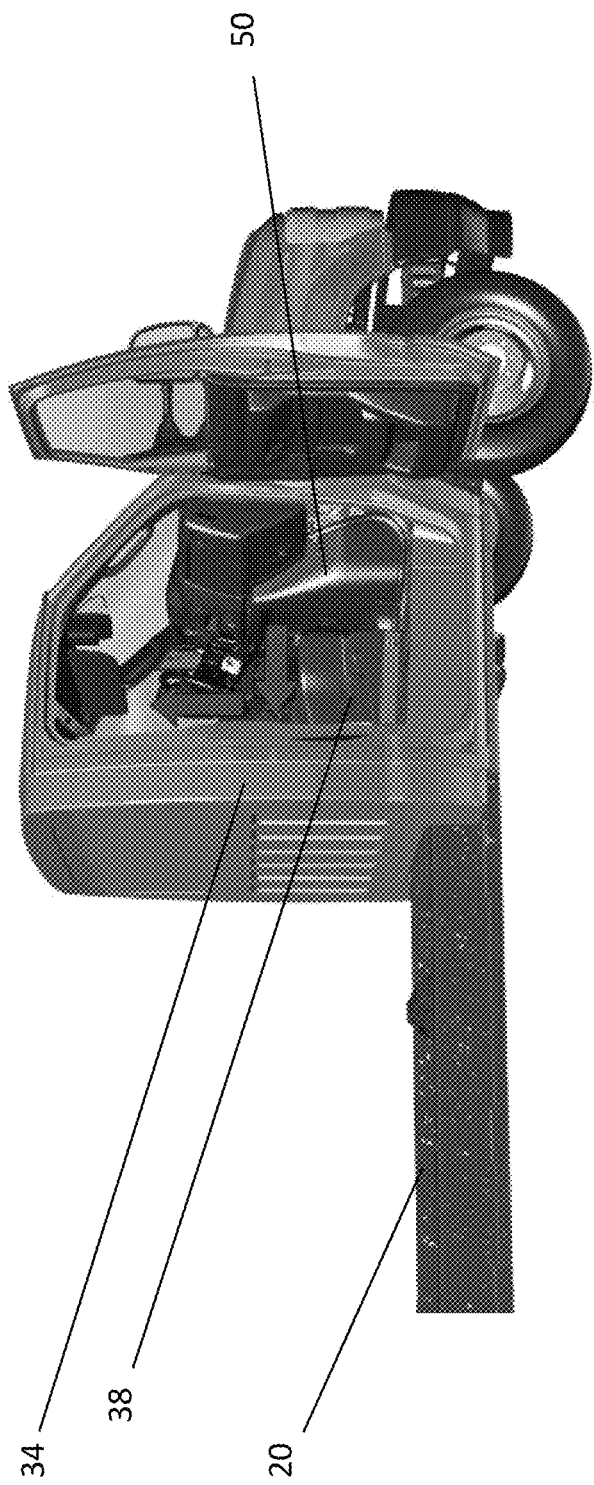
FIG. 9 is a perspective view of the removable center console covering the cradle within the cab of a commercial electric vehicle, in accordance with some embodiments described herein.

FIG. 9 shows a perspective view of a center console 50 covering the cradle 10 within the cab of commercial electric vehicle.

Figure 10:
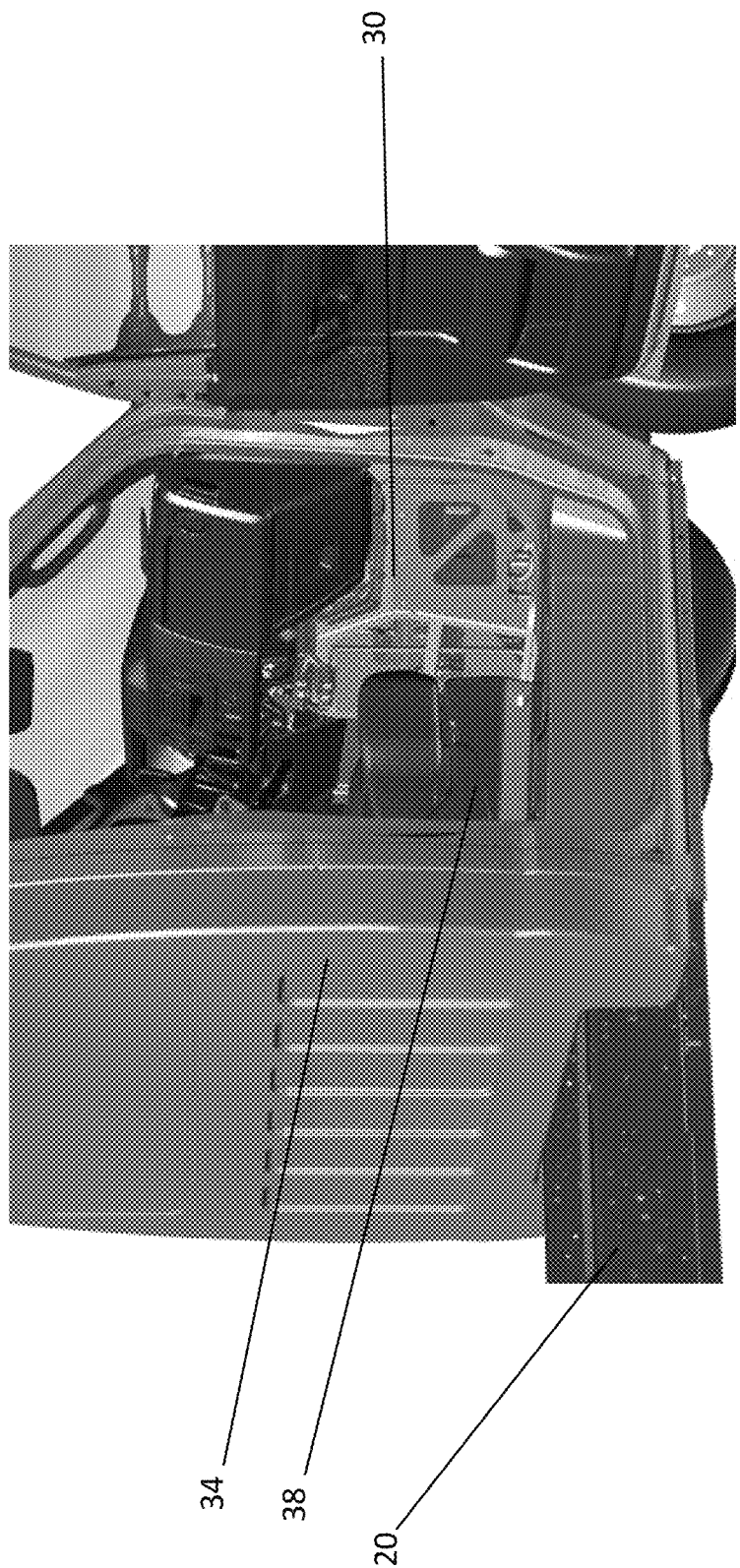
FIG. 10 is a perspective view of the cradle after the center console of FIG. 9 has been removed, in accordance with some embodiments described herein.

FIG. 10 shows a more detailed perspective view of the cradle 10 after the center console 50 of the commercial electric vehicle has been removed.

FIG. 11 is a perspective view of the cradle with hood approach access, in accordance with some embodiments described herein. As shown in the example embodiment, a hood 111 of a vehicle can be opened to allow for access to a front compartment 112 with access to cradle 30.

It should be understood that in various embodiments cradle 10 allows for access to various components through the opening covered by bottom access panel 32 and from within other directions of the cab (dog-house). Alternatively or additionally, access is provided by opening the hood of the vehicle.

In various embodiments, components can be mounted or coupled to one or more of a number of surfaces of the cage and/or cradle. These locations can include inner, outer, top bottom, side, front, back, or other locations.

The foregoing is provided for purposes of illustrating, explaining, and describing embodiments of this disclosure. Modifications and adaptations to these embodiments will be apparent to those skilled in the art and may be made without departing from the scope or spirit of this disclosure.

Although the subject matter has been described in terms of exemplary embodiments, it is not limited thereto. Rather, the appended claims should be construed broadly, to include other variants and embodiments, which may be made by those skilled in the art.

What is claimed is:

1. An apparatus for an electric vehicle comprising,
    a cradle,
    wherein the cradle comprises a housing and a bottom access panel, wherein the housing and the bottom access panel are flexibly coupled together at a shared edge by a hinge; and
    wherein the housing is formed by a trellis of members, wherein the trellis of members form one or more housing apertures in the at least a trellis member of the housing.

2. The apparatus of claim 1, wherein the electric vehicle is a commercial electric vehicle, wherein the trellis of members comprises one or more structural members and one or more flat panels, and wherein the one or more flat panels comprise one or more cavities forming one or more panel apertures.

3. The apparatus of claim 1, wherein the bottom access panel forms an opening in a floor of the cradle when in an open position, wherein the opening in the floor of the cradle is operable to allow a service technician to at least partially enter an interior space of the housing.

4. The apparatus of claim 2, wherein the cradle is situated under a cab of the commercial electric vehicle, wherein the cradle is secured to a footwell of the cab of the commercial electric vehicle, and wherein the cradle is secured to a chassis of the commercial electric vehicle.

5. The apparatus of claim 2, wherein the housing is operable to secure and protect the at least one component of the commercial electric vehicle, wherein the at least one component of the commercial electric vehicle is secured to an interior or exterior face of the housing.

6. The apparatus of claim 5, wherein the at least one component of the commercial electric vehicle is one or more of a valve, an AC compressor, a pump, an electric power control unit, a vehicle control unit, a sensor, an on-board charging module, a power distribution unit, a positive temperature coefficient heater, and a DC/DC converter.

7. The apparatus of claim 2, wherein the one or more housing apertures and one and more panel apertures allow one or more conduits to enter an interior space of the housing, and wherein the one or more conduits is a fluid conduct or an electrical conduit.

8. The apparatus of claim 5, comprising one or more housing panels.

9. The apparatus of claim 8, wherein at least one of the one or more housing panels is a removable housing panel operable to provide access to at least one component for service and repair.

10. The apparatus of claim 2, wherein a at least one component of the commercial electric vehicle is fastened to an interior face of the bottom access panel.

11. The apparatus of claim 10, wherein the at least one component of the commercial electric vehicle is a high-power DC/DC converter.

12. The apparatus of claim 10, wherein the hinge supports at least a weight of the bottom access panel and the at least one component of the commercial electric vehicle when the bottom access panel is in an open position.

13. The apparatus of claim 10, wherein the bottom access panel is operable to provide access to the at least one component of the commercial electric vehicle for service and repair, and wherein the bottom access panel is in an open position.

14. The apparatus of claim 1, wherein an exterior face of the bottom access panel comprises a splash guard operable to stop a projection of water and road debris into an interior of the cradle.

15. The apparatus of claim 1, wherein the bottom access panel is secured in a closed position by one or more bolts.

16. The apparatus of claim 2, wherein at least one face of the housing is at an inclined plane, and wherein a at least one component of the commercial electric vehicle is fastened to the exterior face of the housing of the inclined plane.

17. The apparatus of claim 1, wherein a size of the bottom access panel is within a range between 20 inches and 60 inches, and wherein the size of the bottom access panel is about 40 inches.

18. The apparatus of claim 17, wherein a shape of the bottom access panel is a rectangular shape.

19. The apparatus of claim 2, wherein the trellis of members allow multiple points of access from a cab and a hood of the commercial electric vehicle, and wherein the bottom access panel allows at least one point of access from a service pit or lift.

20. The apparatus of claim 2, wherein the housing of the cradle is covered by a center console of the commercial electric vehicle, wherein the center console of the commercial electric vehicle is operable to be removed to allow access to the housing of the cradle, wherein at least one component of the commercial electric vehicle can be accessed by a service technician.

* * * * *